United States Patent
Lowery (10) Patent No.: US 10,148,607 B2
(45) Date of Patent: Dec. 4, 2018

(54) ELECTRONIC-MESSAGING SYSTEM INTERCEPTOR FORWARDING CLIENT NOTIFICATIONS

(71) Applicant: QUEST SOFTWARE INC., Aliso Viejo, CA (US)

(72) Inventor: John H. Lowery, Marana, AZ (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 390 days.

(21) Appl. No.: 14/867,615

(22) Filed: Sep. 28, 2015

(65) Prior Publication Data

US 2017/0093782 A1    Mar. 30, 2017

(51) Int. Cl.
*H04L 12/58* (2006.01)
*H04L 29/08* (2006.01)
*H04L 29/06* (2006.01)

(52) U.S. Cl.
CPC .............. *H04L 51/24* (2013.01); *H04L 67/02* (2013.01); *H04L 67/025* (2013.01); *H04L 67/125* (2013.01); *H04L 67/22* (2013.01); *H04L 67/2819* (2013.01); *H04L 69/22* (2013.01); *H04L 69/324* (2013.01)

(58) Field of Classification Search
CPC ......... H04L 51/24; H04L 67/02; H04L 69/22; H04L 69/324
USPC .................................. 709/206, 200, 226, 223
See application file for complete search history.

(56) References Cited

U.S. PATENT DOCUMENTS

| | | |
|---|---|---|
| 7,512,682 B2 | 3/2009 | Aronoff et al. |
| 7,756,981 B2 | 7/2010 | Shastri et al. |
| 7,979,494 B1 | 7/2011 | Golovin et al. |
| 8,065,738 B1 | 11/2011 | Kalle |
| 8,185,598 B1 | 5/2012 | Golovin et al. |
| 8,266,231 B1 | 9/2012 | Golovin et al. |
| 8,650,578 B1 | 2/2014 | Binotto et al. |
| 2004/0059789 A1 | 3/2004 | Shum |

(Continued)

FOREIGN PATENT DOCUMENTS

| | | |
|---|---|---|
| WO | WO2009158107 A2 | 12/2009 |
| WO | WO2012080930 A2 | 6/2012 |

OTHER PUBLICATIONS

Dell, "Change Auditor 6.6 Release Notes", available at «http://support-public.cfm.software.dell.com/840b731f-f328-4dd9-95ce-a24b5e38f19a:181053.pdf», Sep. 2014, 32 pages.

(Continued)

*Primary Examiner* — El Hadji M Sall
(74) *Attorney, Agent, or Firm* — Machoff Brennan (57) ABSTRACT

An interceptor, e.g., associated with an electronic messaging (EM) service, transmits a first request to the EM service. The interceptor receives from the EM service a first reply associated with the first request and a notification associated with a client. The interceptor receives, from the client, a second request. The interceptor forwards the second request to the EM service. The interceptor receives from the EM service a second reply associated with the second request. The interceptor creates a modified second reply including at least a portion of the notification by modifying an outer-protocol header of the second reply, an inner-protocol header of the second reply, and an inner-protocol body of the second reply. The interceptor transmits the modified second reply to the client.

15 Claims, 6 Drawing Sheets

(56) References Cited

U.S. PATENT DOCUMENTS

| | | | |
|---|---|---|---|
| 2008/0196099 A1 | 8/2008 | Shastri | |
| 2008/0222153 A1 | 9/2008 | Naresh et al. | |
| 2008/0228880 A1 | 9/2008 | Naresh et al. | |
| 2009/0310595 A1* | 12/2009 | Badger | H04M 7/127 370/352 |
| 2009/0327354 A1 | 12/2009 | Resnick et al. | |
| 2014/0337464 A1* | 11/2014 | McGarva | H04L 45/306 709/217 |
| 2015/0142982 A1 | 5/2015 | Gonzales et al. | |

OTHER PUBLICATIONS

"Outlook Connectivity with MAPI over HTTP", retrieved on Aug. 11, 2015, available at «http://blogs.technet.com/b/exchange/archive/2014/05/09/outlookconnectivitywithmapioverhttp.aspx», Microsoft.com, May 9, 2014, 7 pages.

Quest, "ChangeAuditor Release Notes, Version 5.1.72", available at «http://us-downloads.quest.com/Repository/support.quest.com/ChangeAuditor%20for%20Active%020Directory/5.7/Documentation/ChangeAuditor_5.1.72_ReleaseNotes.htm», Sep. 2010, 16 pages.

Quest, "ChangeAuditor Release Notes, Version 5.6.74", available at «http://us-downloads.quest.com/Repository/support.quest.com/ChangeAuditor%20for%20Active%20Directory/5.7/Documentation/ChangeAuditor_5.6.74_ReleaseNotes.htm», Sep. 2011, 24 pages.

Quest, "ChangeAuditor Hotfix Readme", Quest Software, Inc., Jan. 2012, 6 pages.

"StealthAUDIT for Exchange Mailbox Compliance Data Sheet", available at «http://www.stealthbits.com/products/by-platform/exchange», STEALTHbits Technologies, Inc., 2015, 3 pages.

\* cited by examiner

FIG. 6

ELECTRONIC-MESSAGING SYSTEM INTERCEPTOR FORWARDING CLIENT NOTIFICATIONS

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Electronic messaging, such as email and text messaging, is becoming increasingly popular in both the personal and business communities. For instance, email has become the predominant business tool for communication within and between organizations. With this predominance comes the usage of email as a repository of information, including sensitive or personal information. Such sensitive information has the potential for being misused and/or viewed and may increase the difficulty of maintaining corporate data security and compliance.

Unfortunately, many violations to corporate policies with respect to email go undetected since security actions in such environments are often not audited. For instance, Microsoft Exchange Server™ is a commonly-used enterprise-class messaging platform that provides for collaboration and interaction by routing emails or other communications between senders and recipients and storing the communications for later retrieval. Detailed security-based auditing, however, is not available through native Exchange mechanisms.

To address these and similar problems, some prior schemes provide for monitoring a directory service at an administrator level. Such solutions often include, e.g., reporting changes to mailbox permissions at the domain or administrator level. A major drawback of these schemes is that such high-level monitoring and reporting does not present a user with a comprehensive picture of what is occurring in the messaging environment and does not provide detailed information necessary for prompt and particularized corrective action. For instance, some solutions do not monitor access performed by administrators or others with super or privileged access rights.

SUMMARY

This Summary provides a simplified form of concepts that are further described below in the Detailed Description. This Summary is not intended to identify key or essential features and should therefore not be used for determining or limiting the scope of the claimed subject matter.

An interceptor, e.g., associated with an electronic messaging (EM) service, transmits a first request to the EM service. The interceptor receives from the EM service a first reply associated with the first request and a notification associated with a client. The interceptor receives, from the client, a second request. The interceptor forwards the second request to the EM service. The interceptor receives from the EM service a second reply associated with the second request. The interceptor creates a modified second reply including at least a portion of the notification by modifying an outer-protocol header of the second reply, an inner-protocol header of the second reply, and an inner-protocol body of the second reply. The interceptor transmits the modified second reply to the client.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices, as well as various input and output (I/O)

devices, such as a keyboard, a mouse, a touchscreen, and/or a video display. The information handling system may also include one or more buses operable to transmit communications between the various hardware components.

An electronic monitoring system for an electronic messaging (EM) service may enable real-time security auditing and reporting of activity in the EM service. For instance, some embodiments enable tracking of user activity, non-owner mailbox access, and/or changes to client permissions for folders, delegate assignments, or configuration objects. Some embodiments can also collect and store audit data that enables a user of the monitoring system, e.g., a system administrator of the EM service, to monitor policy violations. For example, administrators may be notified by email or other alerts when possible violations and changes occur. In addition, some embodiments include tools that can take automatic action in response to suspicious or potentially harmful events, such as by quickly disabling a violator's account or reversing detected undesired changes. An electronic monitoring system may include an interceptor configured to analyze or modify communications between the EM service and clients thereof.

Figure 1:
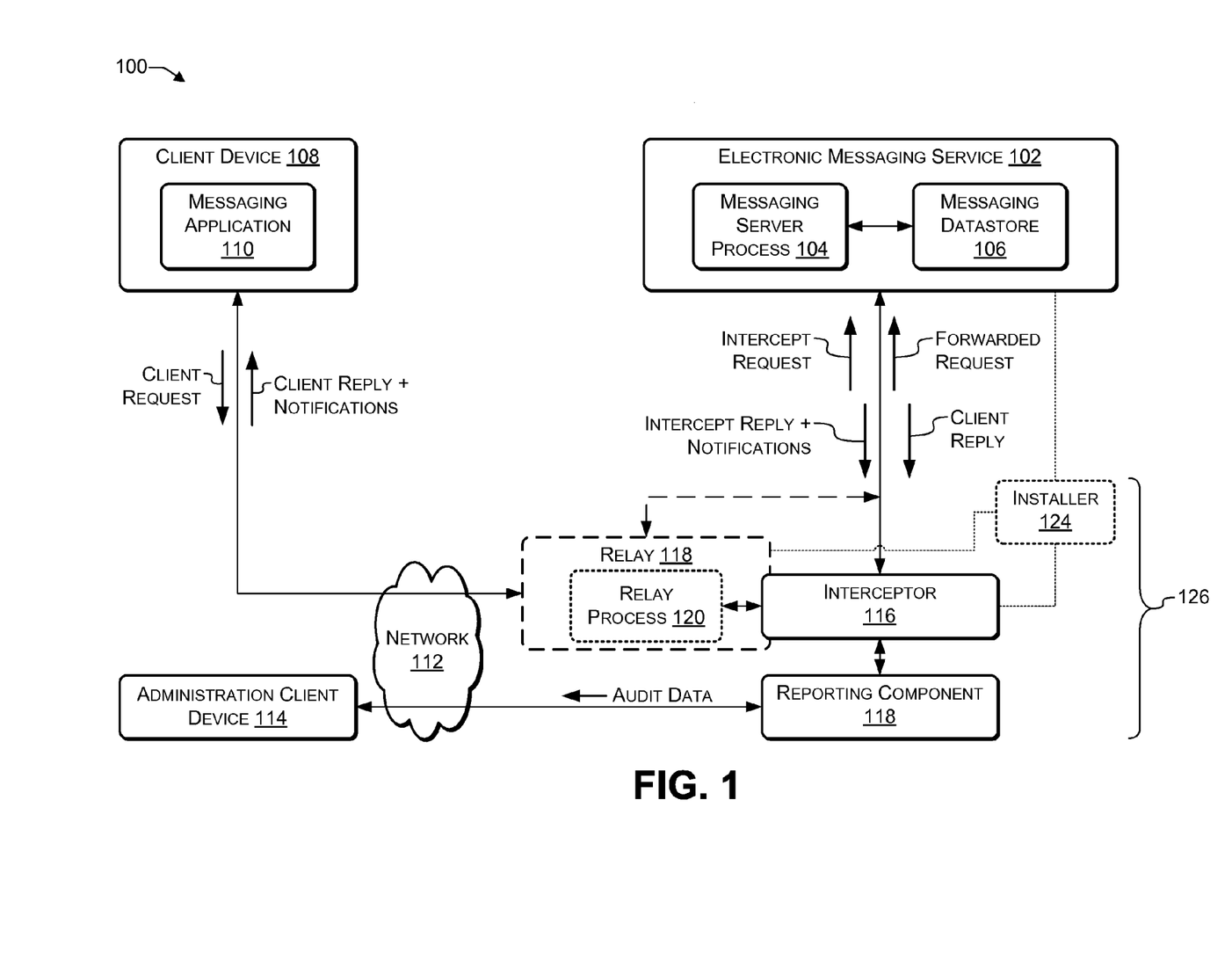
FIG. 1 is a block diagram illustrating an architecture that includes an electronic messaging service according to some embodiments.

FIG. 1 is a block diagram illustrating an architecture 100 that includes an electronic messaging (EM) service 102 according to some embodiments. The EM service 102 may include, for example, features such as email, calendars, appointments, address book(s), contacts, folders, distribution lists, posts, instant-messenger or voicemail communications, tasks or to-do lists, notes, journal entries, combinations of the same or the like. For instance, in some embodiments, the EM service 102 comprises Microsoft Exchange Server™ ("EXCHANGE").

The EM service 102 may be embodied in one or more servers, e.g., cloud or on-premises servers. The EM service 102 may include one or more processes or other executable components, in this example depicted as messaging server process 104. The messaging server process 104 may store data in, and retrieve data from, a messaging datastore 106. In some embodiments, an EXCHANGE store on one or more servers may provide a single repository for the EXCHANGE server data.

A client device 108 may be associated with, e.g., a customer or other user of the EM service 102. Examples of customers may include individuals, businesses, educational institutions, etc. As used herein, a multi-user client computer system is considered to include multiple client devices 108. The customer (or other user, and likewise throughout) may use a software application, such as a messaging application 110, to communicate with the EM service 102, e.g., via one or more network(s), illustrated as network 112. For example, the messaging application 110 can send and receive communications or access mailboxes, folders, or items therein, by communication with the EM service 102. In other examples, the messaging application 110 can create, send, receive, respond to, or delete calendar invitations or scheduled meetings, create or delete to-do list items, or otherwise manipulate data for features such as those listed above. The network 112 may include wired technologies (Ethernet, synchronous optical network (SONET), data over cable service interface specification (DOCSIS), and the like) or wireless technologies (e.g., Bluetooth, code division multiple access (CDMA), global system for mobile (GSM), universal mobile telephone service (UMTS) and the like.

An administration client device 114 may be associated with, e.g., a system administrator, auditor, or other maintainer or operator of the EM service 102. The administration client device 114 can communicate with the EM service 102, e.g., via network 112 or a direct console or other link (omitted for brevity). The system administrator may use the administration client device 114 to create, modify, or delete user accounts, mailboxes, or security rules, access event logs, or otherwise configure, monitor, or audit the EM service 102.

In the illustrated architecture 100, communications between the messaging application 110 and the EM service 102 are passed through an interceptor 116 that interacts with data from the EM service 102. In some embodiments, the interceptor 116 tracks what type of access was performed with respect to the messaging system data. For instance, the interceptor 116 can determine if an item (e.g., email communication, appointment, task list) was read, copied, created, modified, moved, and/or forwarded by a user.

In some embodiments, the interceptor 116 identifies read accesses of messaging system data. Moreover, in some embodiments, information regarding other types of access (e.g., such as when items in the messaging datastore 106 are saved, deleted, moved, copied or modified) is obtained through an API. For instance, data regarding particular events or callback functions in EXCHANGE can be obtained through the EXCHANGE OLE DB (ExOLEDB) providers and Microsoft™ ActiveX™ data objects (ADO).

In some embodiments, the interceptor 116 can comprise multiple modules that interact with different portions of the messaging service. For instance, in some embodiments, the interceptor 116 tracks or "listens" to user activity in the messaging datastore 106 and/or changes to server protocol configurations of the EM service 102. In some embodiments, the interceptor 116 is configured to track activity by general users, users with special privileges (e.g., send-as privileges), or administrators, super users and/or other personnel with special access rights (such as privileges granted by a mailbox owner). For brevity, the term "message" as used herein refers to a request, reply, or notification transferred between the messaging application 110, the interceptor 116, the EM service 102, or other components communicatively connected with these.

In some embodiments, communications with the interceptor 116 pass through or are controlled or mediated by a relay 118 running a relay process 120. For example, Messaging Application Programming Interface (MAPI) messages can be encapsulated in the Hypertext Transfer Protocol (HTTP) protocol according to the MAPI over HTTP specification. For example, the relay 118 can include a Web server, and HTTP messages carrying encapsulated MAPI messages can be exchanged between the client device 108 and the relay 118. The relay process 120, e.g., an HTTP server process, can extract MAPI messages from received MAPI-over-HTTP messages and provide the extracted MAPI messages to the interceptor 116 or to the EM service 102. The relay process 120 can additionally or alternatively receive MAPI messages from the interceptor 116 or the EM service 102, encapsulate the MAPI messages in HTTP messages, and transmit the encapsulated MAPI-over-HTTP messages to the client device 108.

In some embodiments, the interceptor 116 comprises a special purpose module, e.g., in a dynamic link library (DLL) file, that monitors and interacts with the messaging server process 104. For instance, the DLL file can be configured to intercept original EM functions (e.g., calls to the EXCHANGE process "store.exe") and further process information provided by the messaging server process 104. In some embodiments, the interceptor 116 can comprise a hook, one or more injected functions or jump instructions, a jump table, a program, a script, combinations of the same or the like. For example, the interceptor 116 can include a hook added to the NdrServerCall2 remote procedure call (RPC) function, which is called whenever a synchronous RPC method is invoked. In some embodiments, the interceptor 116 can include a hook added to the NdrAsyncServerCall RPC function, which is called to invoke an asynchronous RPC method, the RpcAsyncCompleteCall function, which is called to complete an asynchronous RPC method, or both. Hooks can be added in the EM service 102 or in the relay 118, e.g., as part of messaging server process 104 or the relay process 120, respectively, or as one or more separate processes.

In some embodiments, the interceptor 116 comprises a plugin, e.g., for the messaging server process 104 or the relay process 120. For example, the interceptor 116 can include a plugin for EXCHANGE, an HttpModule plugin for the relay 118 such as a MICROSOFT ASP.NET Web server, an APACHE HTTPD module, or another plugin. The term "plugin" can include add-ons, extensions, or other processor-executable modules communicating with the messaging server process 104 (or the relay process 120) via an application program interface (API) or other communication channel defined by the messaging server process 104 (or the relay process 120). In some embodiments, the relay process 120 extracts MAPI messages from MAPI-over-HTTP messages to or from the EM service 102 and provides the MAPI messages to the interceptor 116. In some embodiments, the relay process 120 provides to the interceptor 116 MAPI-over-HTTP messages to or from the EM service 102, and permits the interceptor 116 to modify those messages before they are transmitted by the relay 118.

In some embodiments, the illustrated interceptor 116 monitors communications with a single client device 108. In these embodiments, multiple interceptors 116 can be used, one for each client device 108. In some embodiments, the illustrated interceptor 116 monitors communications with more than one client device 108, e.g., using multiple processes or threads, or using a session-state data store. In some embodiments, the interceptor 116 includes multiple hooks or plugins running in respective, different threads of the messaging server process 104 or the relay process 120.

In some embodiments, the interceptor 116 includes multiple cooperating components, or multiple interceptors 116 cooperate to monitor communications with a particular client device 108. For example, as noted above, the interceptor 116 can include hooks for both the NdrAsyncServerCall RPC function and the RpcAsyncCompleteCall function. Alternatively, one interceptor 116 can hook NdrAsyncServerCall, a second interceptor (omitted for brevity) can hook RpcAsyncCompleteCall, and the two interceptors 116 can cooperate to monitor communications.

The illustrated interceptor 116 can communicate data obtained from and/or about the monitored EM service 102 to a reporting component 122. In some embodiments, the interceptor 116 can communicate with the reporting component 122 directly or via the relay 118. The reporting component 122 can communicate with the administration client device 114, e.g., via network 112 or a console or other direct connection.

In some embodiments, the messaging application 110 of the client device 108 transmits a first request ("Client Request") toward the EM service 102. The interceptor 116 detects the first request by the client. For example, the first request can include a request to access a mailbox associated with the electronic messaging service, e.g., to retrieve messages, open a folder, or check for new mail. In some embodiments, the first request can include a request that the EM service 102 provide the messaging application 110 of the client device 108 a notification when new messages are available for retrieval in a mailbox specified in the first request.

In some embodiments, e.g., in response to the detection of the first request, the interceptor 116 transmits a second request ("Intercept Request") to a server process of the electronic messaging service, e.g., the messaging server process 104. The second request can correspond to or otherwise be associated with the mailbox. For example, the second request can include a context record, session identifier, cookie, or other value retrieved or derived from the first request. For example, in order to audit the first request, the interceptor 116 may request data from the EM service 102 regarding the client's access permissions to the specified mailbox.

In some embodiments, when the interceptor 116 begins operation, the interceptor 116 may not have information regarding the state of the EM service 102 or client(s) that are connected thereto. Moreover, clients may cache information about the state of private or public mailboxes of the EM service 102. The interceptor 116, in order to audit messages more effectively, can transmit the second request to obtain additional state information for mailboxes or the client's session.

In some embodiments, the EM service 102 requires the second request be accompanied by a context handle or other token indicating that the interceptor 116 is authorized to access the mailbox. Transmitting the second request in response to receiving the first request permits the interceptor 116 to use the client's token. In some embodiments, the interceptor 116 caches the token and uses it to make future requests that are not in response to receipt of a first message from the client.

In some embodiments, the interceptor 116 receives from the server process, e.g., in response to the second request, a first reply associated with the second request. In some embodiments, the interceptor 116 additionally or alternatively receives from the server process one or more notifications associated with (e.g., intended for) the client ("Intercept Reply+Notifications"). In some embodiments, the interceptor 116 can then transmit additional requests to the EM service 102 and receive additional responses. In some embodiments, the notifications are in response to request previously made by the client. The interceptor 116 may be unaware of pending client requests for notifications.

The first reply can include state information requested by the interceptor 116, e.g., number of unread messages in a folder or names of folders in the mailbox. The notifications can include, e.g., event-occurrence messages such as EXCHANGE RopNotify messages. Event-occurrence messages can indicate, e.g., that new mail is available, that a message or other data item stored in the EM service 102 has been created, copied, deleted, or changed, that a search or other asynchronous operation has completed, or that another event defined by the EM service 102 has occurred. The notifications can additionally or alternatively include notification-ready messages such as EXCHANGE RopPending messages. Notification-ready messages can indicate that the client should request additional notification messages from the EM service 102.

In some embodiments, the interceptor 116 forwards the detected first request to the server process ("Forwarded Request"). This permits transparent monitoring of client actions. In some embodiments, the interceptor 116 forwards the detected first request to the server process only if the detected first request satisfies selected criteria, e.g., access criteria or other security criteria.

In some embodiments, the interceptor 116 receives from the server process, e.g., in response to the forwarded first request, a second reply ("Client Reply"). The second reply can be associated with the first request. The second reply can include additional notifications.

In some embodiments, the interceptor 116 creates a modified second reply including at least a portion of at least one of the notifications. In some embodiments, the interceptor 116 modifies an outer-protocol header, an inner-protocol header, and an inner-protocol body of the second reply to provide the modified second reply including at least a portion of at least one of the notifications added to the received second reply. For example, the interceptor can add, remove, or alter one or more outer-protocol headers, inner-protocol headers, or inner-protocol bodies of the second reply. The modified second reply can include only ones of the notifications from the first reply, both notifications from the first reply and notifications from the second reply, or only notifications from the second reply. In some embodiments, the interceptor 116 modifies a header and a body of the second reply to provide the modified second reply including at least a portion of at least one of the notifications. Further examples are discussed below with reference to FIGS. 2 and 3.

In some embodiments, the interceptor 116 transmits the modified second reply to the client ("Client Reply+Notifications"), or otherwise forwards or conveys the notifications to the client. Providing the notifications to the client permits the client to maintain an accurate view of the state of the mailbox. Providing the notifications to the client can also permit auditing without affecting the connection between the messaging application 110 and the messaging server process 104 in a way detectable to the messaging application 110. For example, the messaging application 110 on the client device 108 can be unaware of the intercept request or intercept reply, and only see that the client request was made and a client reply, e.g., including notifications, was received. This permits transparently auditing transmissions between the client device 108 and the EM service 102 without changing the interface the EM service 102 presents to the client device 108. Using transparent auditing with intercepts or forwarding of notification can permit efficiently auditing data for a large number of users or mailboxes, e.g., without having to enable auditing on each such user or mailbox individually.

In some embodiments using the relay 118, the interceptor 116 can be communicatively connectible with an HTTP server of the relay 118. The interceptor 116 can be configured to detect the first request including an HTTP request (such as a GET or POST) and to transmit the modified second reply including an HTTP reply (such as a 200 OK reply).

In some embodiments, the interceptor 116 transmits data of, corresponding to, or otherwise associated with one or more of the requests, replies, or notifications to the reporting component 122. In some embodiments, the reporting component 122 transmits audit data associated with at least part of the first request or at least part of the second reply. For example, the reporting component 122 can transmit the audit data to the administration client device 114, e.g., via network 112. The reporting component 122 can additionally or alternatively transmit the audit data via a serial link, a video link such as VGA, DISPLAYPORT, or HDMI, or another communications interface.

In some embodiments, the audit data can include copies of some or all of the data of the at least part of the first request or at least part of the second reply. In this way, the audit data can provide information of client activities. In some embodiments, the audit data corresponds to both the at least part of the first request and the at least part of the second reply. This permits auditing the state of the EM service 102 as visible to the messaging application 110, and auditing changes in the state of the EM service 102 due to client requests.

In some embodiments, the audit data can additionally or alternatively include data of at least part of the second request ("Intercept Request") or at least part of the first reply ("Intercept Reply+Notifications"). For example, the reporting component 122 can transmit an indication of at least part of the first reply in association with (e.g., included in or linked via an identifier to) the audit data. This can permit the audit data to more accurately represent client actions. For example, the second request can request information about the state of the EM service 102, e.g., the identity of the currently logged-in user. The first reply can, accordingly, include that state information.

In some embodiments, the audit data can bundle state information with information of client requests or replies to provide accurate information of the effect a client's actions had on the EM service 102. For example, the second request can request information about folder permissions for a folder referenced in the first request. The interceptor 116 can, after receiving the second reply, request information about the folder permissions. The interceptor 116 can then provide the reporting component 122 information of permissions before the client's action, information of the identity or nature of the client's action (e.g., an operation code or name), and information of permissions after the client's action. This permits determining the effect of the client's action on the folder permissions. Before-and-after auditing can also permit identifying client actions or messages that have unexpected side effects, e.g., messages that trigger or exploit a vulnerability in the EM service 102.

In some examples, an installer 124 communicates with the EM service 102 or the relay 118 to cause messages to be routed through the interceptor 116. For example, the installer 124 can register one or more components or modules (e.g., COM objects) with one or more servers. In some examples, the installer 124 can register plugins of the interceptor 116 with, or install hook functions of the interceptor 116 in, the messaging service process 104 or the relay process 120. In some examples, some functions of the installer 124 are carried out before commencing monitoring. In some examples, some functions of the installer 124 are carried out upon receipt of a message at the EM service 102, e.g., a client request meeting predetermined criteria.

In some examples, an electronic monitoring system 126 includes the interceptor 116 and the installer 124. In some examples, the electronic monitoring system 126 includes the interceptor 116, the reporting component 122, and the installer 124. In some examples, the electronic monitoring system 126 provides audit data in a standardized or open format, e.g., the Extensible Markup Language (XML).

Figure 2:
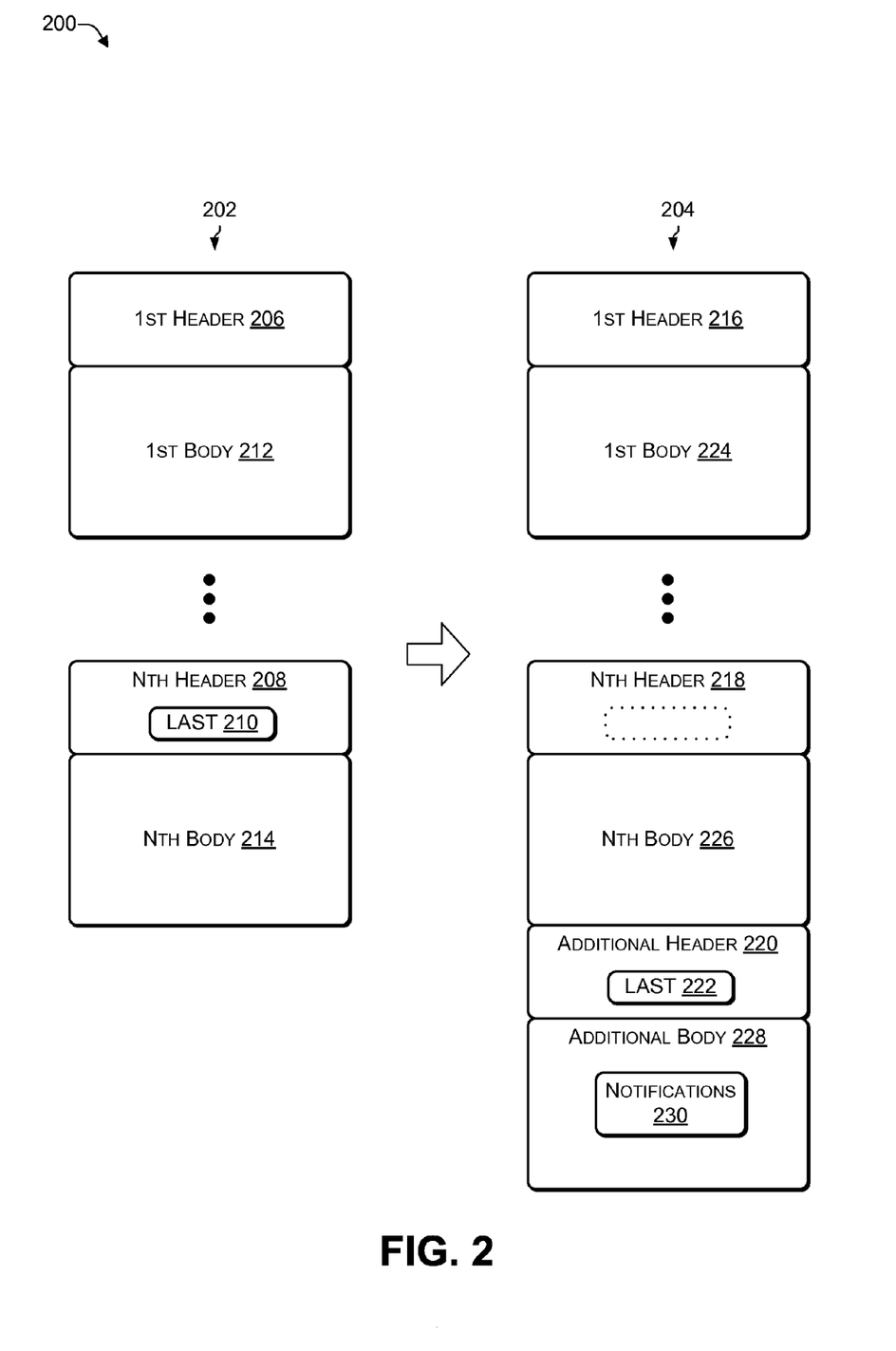
FIG. 2 illustrates an example modification of messages to add notifications.
Figure 3:
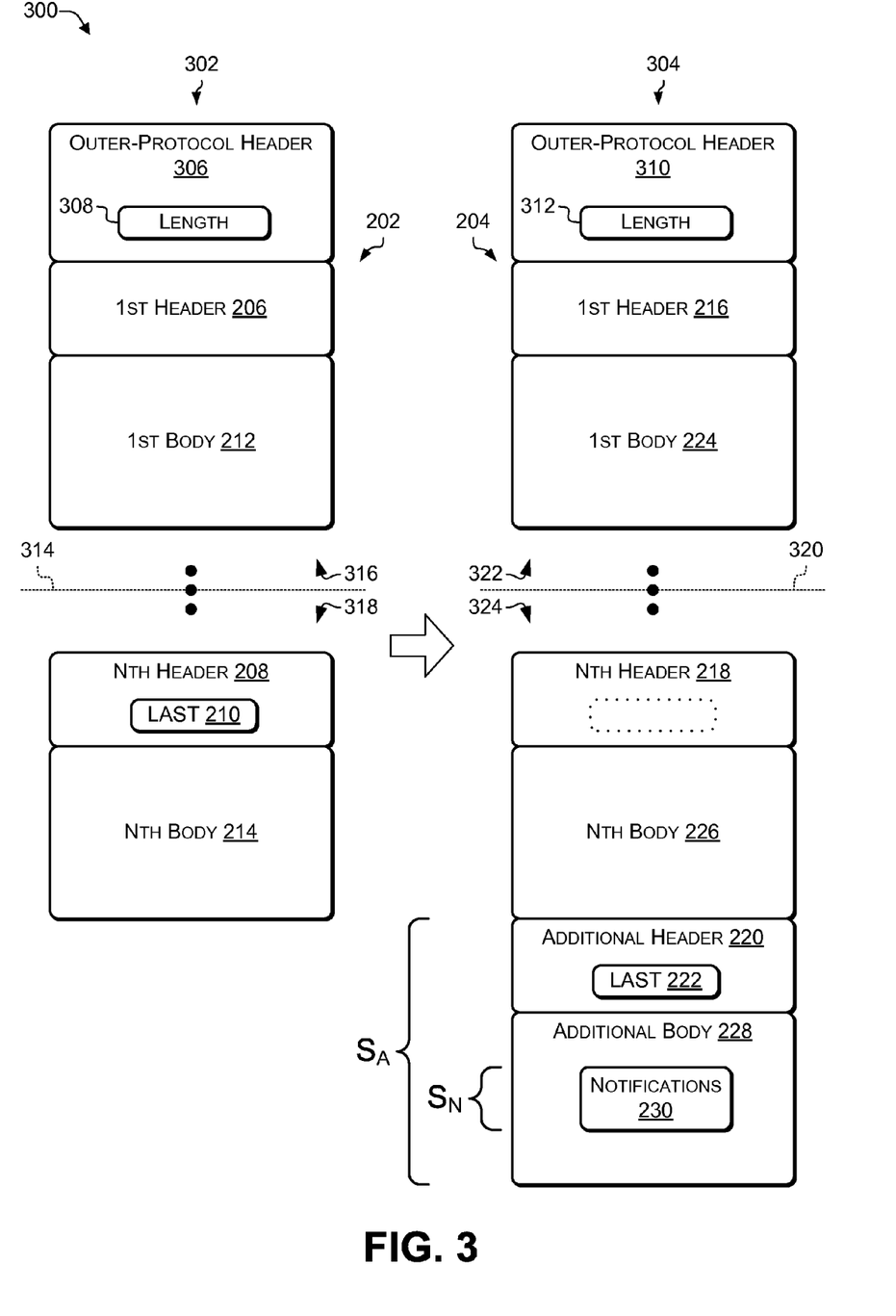
FIG. 3 illustrates an example modification of messages to add notifications to an inner-protocol message encapsulated in an outer protocol.

FIG. 2 shows an example 200 of transformation of messages as described above with reference to FIG. 1. Message 202 can be, e.g., a reply message from the EM service 102. Message 204 can be a modified reply message, e.g., provided by the interceptor 116. In the illustrated example, messages 202 and 204 are MAPI messages carrying EM data. However, this is not limiting, and other protocols can be used. In FIG. 2 and FIG. 3, below, other headers, footers, or data elements not illustrated can be present in the messages.

Message 202 includes one or more headers, such as a first header 206 to an Nth header 208 (where N≥1). The Nth header 208 (or the first and only header 206 if N=1) carries data indicating that header is the last header in the reply, graphically represented by LAST field 210. Message 202 includes, for individual ones of the headers 206 to 208, corresponding reply bodies, such as a first reply body 212 to an Nth reply body 214. For example, the reply bodies 212 to 214 can include MAPI Remote Operation (ROP) responses. The ROP responses can include, e.g., contents of email messages.

Message 204 is a modified message including one or more headers, such as a first header 216 to an Nth header 218 and an additional header 220. The additional header 220 carries data indicating that header is the last header in the reply, graphically represented by LAST flag 222. In some embodiments, at least some of the first header 216 through the Nth header 218 are copies of respective ones of the first header 206 through the Nth header 208. For example, the first through N−1th headers in message 204 can be copies of the first through N−1th headers in message 202. In some embodiments, all but one, or all but K (K<N) of the headers in message 204 can be copies of corresponding ones of the headers in message 202. In some embodiments, one or more of the headers 216 through 218 in message 204 can be modified, e.g., to include length, count, or other status or framing information different from corresponding information in the headers 206 through 208 of message 202. In the illustrated example, Nth header 218 has been modified compared to Nth header 208 to remove the LAST field 210 (graphically represented by the dotted empty box in Nth header 218).

In the illustrated example, message 204 includes, for individual ones of the headers 216 to 220, corresponding reply bodies, such as a first reply body 224 to an Nth reply body 226 and an additional reply body 228. For example, the reply bodies 224 to 226 and 228 can include MAPI Remote Operation (ROP) responses. In some embodiments, all, or all but one, or all but L (L<N) of the reply bodies 224 through 226 in message 204 can be copies of corresponding ones of the headers in message 202.

In the illustrated example, the additional reply body 228 can include notifications 230 saved by the interceptor 116, e.g., from the first reply ("Intercept Reply+Notifications") shown in FIG. 1. In other examples, one or more of the reply bodies 224 to 226 can be modified to include one or more of the notifications 230 in each modified one of the reply bodies 224 to 226. In some embodiments, one or more of the headers 216 to 218 or the reply bodies 224 to 226 can be removed, e.g., for later transmission, or to make space in a restricted buffer for the notifications 230. The notifications 230 can include, e.g., data indicating that a user's mailbox has been updated and that new emails are ready to be retrieved.

FIG. 3 shows another example 300 of transformation of messages, e.g., as described above with reference to FIG. 1. Message 302 can be, e.g., a reply message from the EM service 102. Message 304 can be a modified reply message, e.g., provided by the interceptor 116. In the illustrated example, messages 302 and 304 are MAPI-over-HTTP messages. However, this is not limiting, and other protocols can be used. In this example, some message components are as described above with reference to FIG. 2, and share numbers with FIG. 2. For example, message 302 includes message 202 and message 304 includes message 204 as shown.

Message 302 is an outer-protocol message encapsulating inner-protocol message 202 in the illustrated example. Message 302 includes outer-protocol header 306, which can include information regarding the encapsulation of the inner-protocol message 202. For example, an HTTP outer-protocol header 306 can include Content-Type or Content-Transfer-Encoding headers corresponding to the inner-protocol message 202. In the illustrated example, the outer-protocol header 306 includes length information 308, e.g., an HTTP Content-Length header. The length information 308 can represent, e.g., the number of octets (bytes) contained in the inner-protocol message 202.

Message 304 is an outer-protocol message encapsulating inner-protocol message 204, e.g., a modified reply, in the illustrated example. Message 304 includes outer-protocol header 310, in this example having length information 312. In some embodiments, the interceptor 116 modifies the length information 308 in the outer-protocol header 306 to provide the modified outer-protocol header 310 having the modified length information 312. For example, the interceptor 116 can adjust the length information 312 or another a length field of the outer-protocol header 310 based at least in part on a size $S_N$ of the at least some of the notifications 230. In some embodiments, the interceptor 116 can adjust the length information 312 based at least in part on a size $S_A$ of the additional header 220 and the additional reply body 228 including the notifications 230.

In some embodiments, as discussed above, the interceptor 116 can modify an outer-protocol header 306, an inner-protocol header such as the additional header 220, and an inner-protocol reply body 228 of the second reply message 302 to add at least some of the notifications to the received second reply message 302, thereby providing modified second reply message 304. As noted above, in some embodiments, the inner-protocol header 220 can include a Remote Procedure Call (RPC) header and the inner-protocol reply body 228 can include EM data.

In the illustrated example, the modification of the inner-protocol reply body includes adding the inner-protocol reply body 228 to the second reply message 302. In other examples, the modification of the inner-protocol reply body can include removing, or changing data in, one or more of the inner-protocol reply bodies 212 through 214. In some embodiments, messages 302 and 304 can each have only one inner-protocol header 206, 216 or only one inner-protocol reply body 212, 224, and one or both of the inner-protocol header 216 and the inner-protocol reply body 224 in message 304 can be modified compared to the inner-protocol header 206 and the inner-protocol reply body 212 in message 202.

In some embodiments, message 304 is processed or transmitted in multiple chunks or other groups of data. This is graphically represented by divider 314 between two example chunks 316, 318 of message 302 and divider 320 between two example chunks 322, 324 of message 304. In some embodiments in which the interceptor 116 is a plugin, the interceptor 116 provides data of the outer protocol header and of the inner-protocol message to the divider 320 as one chunk 322, and data from the divider 320 through the end of the additional reply body 228 as another chunk 324.

For example, the relay 118 can provide the interceptor 116 with data of chunk 316 of message 302 up to the divider 314, and the interceptor 116 can respond to the relay 118 with data of chunk 322 of message 304 up to the divider 320.

Separately, e.g., subsequently, the relay 118 can provide the interceptor 116 with data of chunk 318 of message 302 after the divider 314, and the interceptor 116 can respond to the relay 118 with data of chunk 324 of message 304 after the divider 320. In some of these examples, the interceptor 116 can determine, before receiving data of chunk 318 of the message 302 after the divider 314, what changes will be required to chunk 324 of the message 304 after the divider 320. For example, the interceptor 116 can determine a number of that notifications 230 that will fit in a buffer allocated for the message 304, and provide the length information 312 increased by a byte count of the determined number of the notifications 230, before providing chunk 324.

Figure 4:
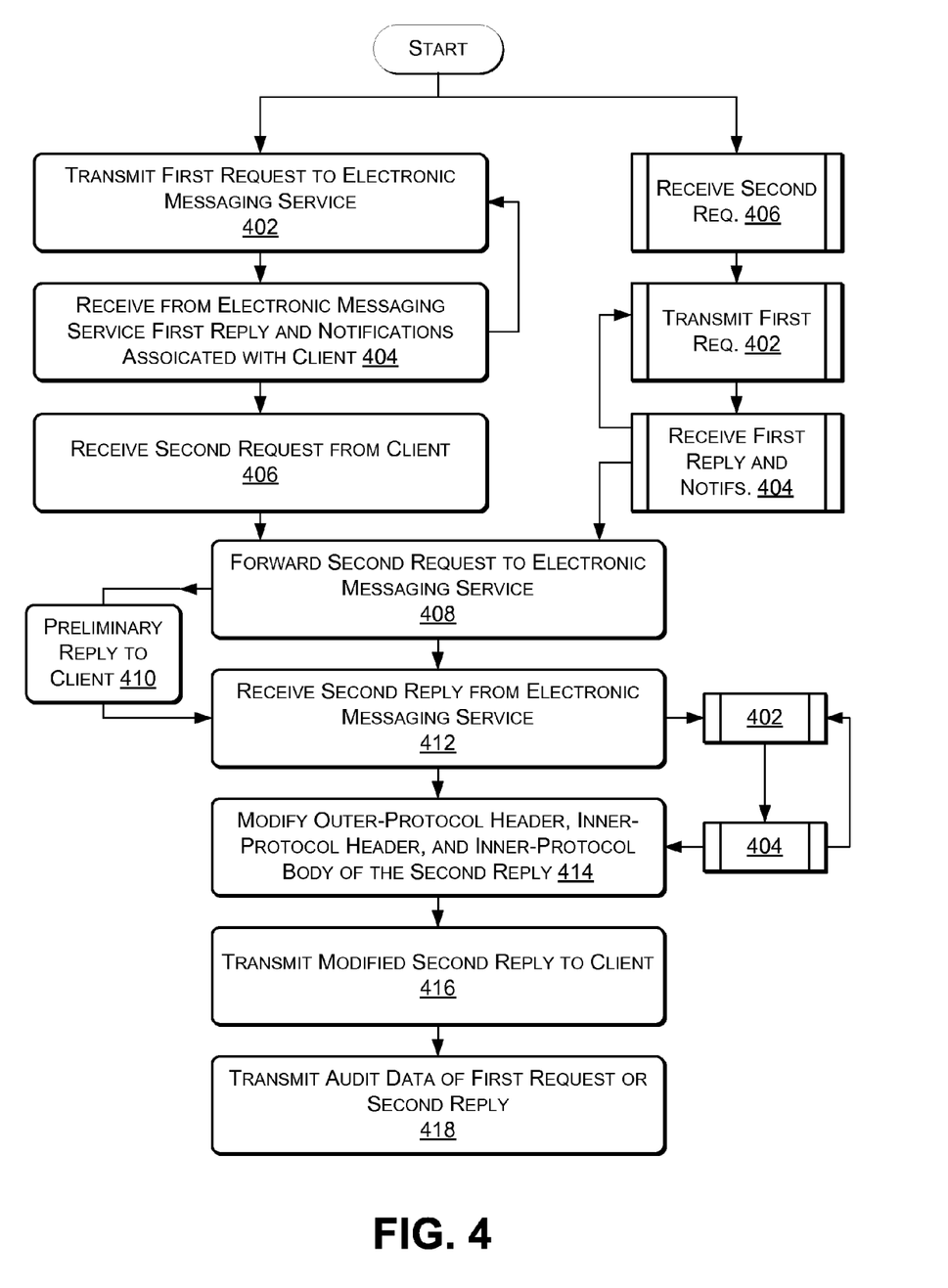
FIG. 4 is a flowchart of a process that includes receiving notifications according to some embodiments.
Figure 5:
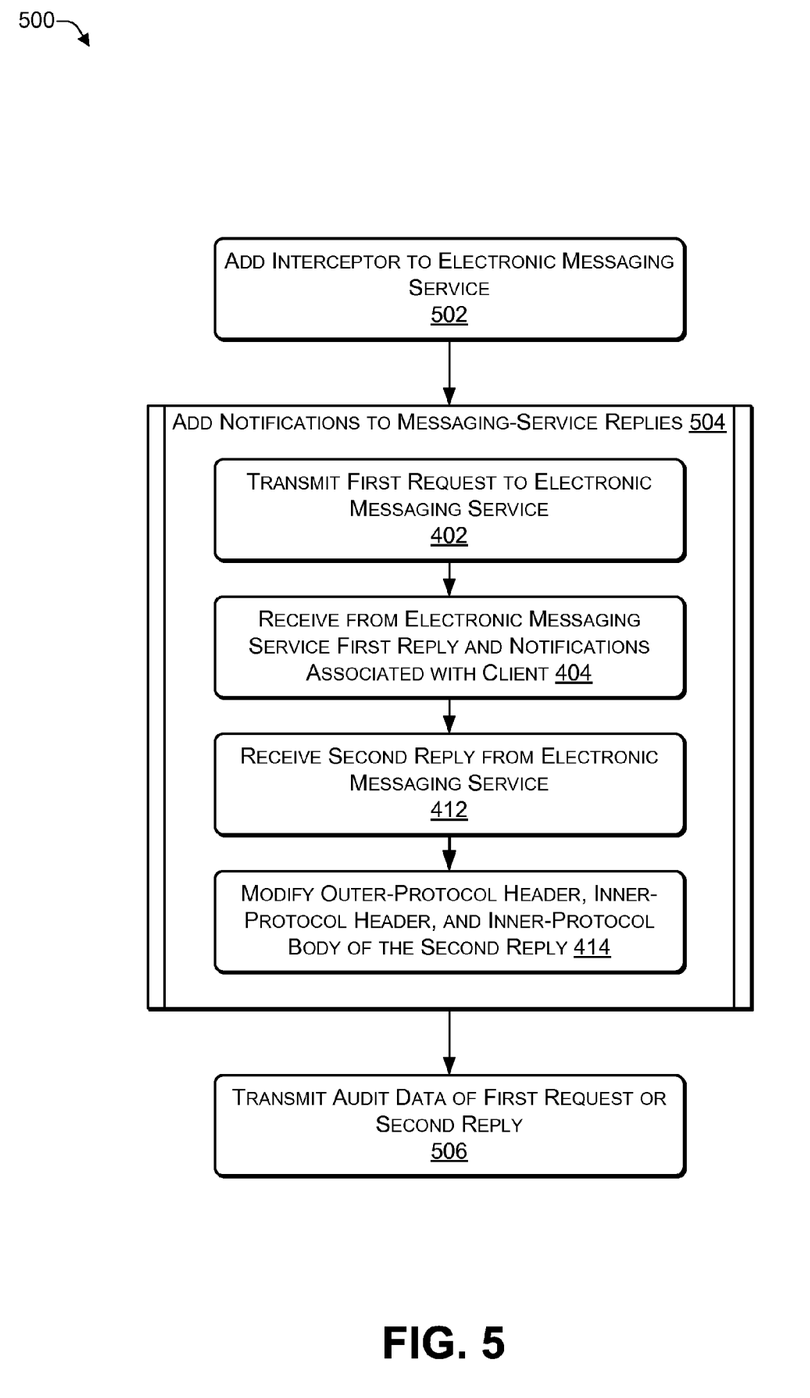
FIG. 5 is a flowchart of a process for monitoring an electronic messaging service according to some embodiments.

In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, and 3, as described above, although other models, frameworks, systems, and environments may implement these processes. Components of FIG. 1, 2, or 3 specifically identified in the discussion below are solely for clarity of explanation and are not limiting.

FIG. 4 is a flowchart of a process 400 that includes receiving notifications according to some embodiments. The process 400 may be performed by the interceptor 116 of FIG. 1. In some embodiments, messages to and from the interceptor 116, such as messages described below, pass through the relay 118, FIG. 1, between the interceptor 116 and the client device 108 or the EM service 102.

At 402, a first request is transmitted to an EM service. For example, in FIG. 1, the interceptor 116 may transmit the intercept request to the EM service 102.

At 404, e.g., in response to the first request, a first reply associated with the first request and notifications associated with a client are received from the EM service. For example, in FIG. 1, the interceptor 116 may receive the intercept reply accompanied by one or more notifications from the EM service 102. As indicated, blocks 402 and 404 may be repeated to obtain additional information.

At 406, a second request is received from the client. For example, in FIG. 1, the interceptor 116 may receive the client request from the messaging application 110 via the network 112.

At 408, the received second request is forwarded to the EM service. For example, in FIG. 1, the interceptor 116 may forward the client request to the EM service 102. Block 408 can be followed by block 410 or block 410.

At 410, a preliminary reply is transmitted to the client. The preliminary reply can be associated with the second request. For example, the preliminary reply can include an indication that an asynchronous response, e.g., to the second request, is pending and will be transmitted later. The preliminary reply can be transmitted, e.g., before receiving a second reply (at 412, below). Using block 410 can permit transparently intercepting asynchronous communications from the client device 108.

At 410, e.g., in response to the forwarded second request, a second reply, e.g., associated with the second request, is received from the EM service. For example, in FIG. 1, the interceptor 116 may receive the client reply from the EM service 102. In some embodiments, after receiving the second reply, one or more further requests may be transmitted to the EM service 102 (at 402) and corresponding replies may be received (at 404). This can permit, e.g., including in audit data state information before and after processing of the second request by the EM service 102.

At 412, a modified second reply is created. The modified second reply includes at least a portion of at least one of the notifications. The modified second reply can be created by modifying the second reply to add at least some of the notifications to the received second reply. Creating the modified second reply can include modifying a header of the second reply and a body of the second reply, e.g., as discussed above with reference to FIG. 2. Creating the modified second reply can additionally or alternatively include modifying an outer-protocol header of the second reply, an inner-protocol header of the second reply, and an inner-protocol body of the second reply, e.g., as discussed above with reference to FIG. 3.

In some embodiments, a header and body of the second reply, or an outer-protocol header, inner-protocol header, and inner-protocol body of the second reply, can be modified by or in a single interceptor process, e.g., under a single operating-system Process ID (PID), to provide the modified second reply. This can remove data exchanges between processes while producing the modified second reply, increasing the rate at which messages can be processed. Higher processing rates can reduce latency introduced by auditing, maintaining transparency of the auditing. In some embodiments, the outer-protocol header can be modified prior to modifying the inner-protocol body. For example, in FIG. 3, the length information 312 can be modified prior to adding the additional reply body 228 to the message 304. This can permit using sequential access to buffers rather than random access to those buffers, increasing the message-processing rate.

In some embodiments, the outer-protocol header includes an HTTP reply header, e.g., an HTTP Response header, and the inner-protocol header includes a Remote Procedure Call (RPC) reply header. For example, the RPC reply header can include a reply header provided by an EM service such as the EM service 102, FIG. 1. These examples can support, e.g., the MAPI over HTTP protocol used, e.g., in EXCHANGE. For example, in FIG. 3, the LAST field 210 of the RPC header 208 can be modified, and the length information 308 in the Content-Length field of the HTTP outer-protocol header 306 can be modified. In some embodiments, the length information 308 in the Content-Length field can be modified before the LAST field 210 is modified. For example, a number of the notifications associated with the client can be determined and the length information 308 in the Content-Length field adjusted appropriately in advance of adding the notifications to the message 304.

For example, in FIGS. 2 and 3, a length field such as length information 308 of the outer-protocol header 306 can be adjusted based at least in part on a size of the at least some of the notifications 230. In some embodiments, the inner-protocol body is modified by inserting the at least some of the notifications 230 between a first portion of the received second response, e.g., inner-protocol reply body 212 and a second portion of the received second response, e.g., inner-protocol header 208. In some embodiments, the at least some of the notifications are appended or prefixed to the contents of the inner-protocol body, e.g., one of the inner-protocol reply bodies 212 through 214. In some embodiments, buffers holding one or more portions of the inner-protocol message 202 are rearranged, copied, shifted, relinked, expanded, or contracted to make room for the notifications, or one or more buffers are added or removed.

At 414, the modified second reply is transmitted to the client. For example, in FIG. 1, the interceptor 116 may transmit the modified second reply ("Client Reply +Notifications" to the client device 108 via the network 112.

In the example discussed above, transmitting the first request at 402 and receiving the first reply and notifications at 404 are performed prior to receiving the second request at 406. However, these steps can be performed in other sequences or relative orders. In some embodiments, illustrated at the right side of FIG. 4, the transmitting the first request at 402 and the receiving the first response 404 are performed in response to the receiving the client request at 406. In other examples (omitted from the drawing for brevity), the first request is transmitted at 402, the second request is received at 406, and the first reply is received at 404, in that order.

At 416, audit data corresponding to at least part of the first request or at least part of the second reply is transmitted, e.g., via a communications interface. In some embodiments, the interceptor 116 can transmit audit data to the reporting component 122. In some embodiments, the reporting component 122 can transmit audit data to the administration client device 114.

Thus, a client may issue a request via messaging application 110. The interceptor 116 may receive the request and transmit its own request to the EM service 102. The interceptor 116 may receive a response to its request, accompanied by notifications associated with the client. The interceptor 116 may forward the client's request to the EM service 102. The interceptor 116 may receive a response to the client's request and add the notifications to that response. The interceptor 116 may then provide the modified response, including the notifications, to the client. The interceptor 116 may additionally provide data of one or more of the requests, replies, or notifications to the reporting component 122. The reporting component may provide audit data to the administration client device 114.

FIG. 5 is a flowchart of a process 500 for monitoring an EM service according to some embodiments. The process 500 may be performed, e.g., by the interceptor 116 or the electronic monitoring system 126 of FIG. 1.

At 502, an interceptor executable in one or more processors is added to the server. For example, in FIG. 1, the interceptor 116 or the installer 124 can install one or more hooks on one or more functions, API calls, processes, or threads, register one or more plugins with messaging server process 104 or relay process 120, activate one or more registered plugins, or subclass or one or more windows or event loops. In an example, at 502, the interceptor 116 can be registered as a plugin with a Web server in the relay 118.

At 504, using the interceptor, notifications are added to messaging-service replies to client requests. For example, in FIGS. 1 and 4, the interceptor 116 can perform the transmitting the first request at 402, the receiving the notifications at 404, the receiving the second reply at 410, or the modifying at 412. The interceptor 116 can additionally or alternatively perform other steps shown in FIG. 4 and omitted from FIG. 5 for brevity.

At 506, audit data can be transmitted, e.g., via a communications interface. This can be done, e.g., as described above with reference to FIG. 4, block 416. The audit data can correspond to at least part of the first request or at least part of the second reply. For example, in FIG. 1, the interceptor 116 can provide audit information to the reporting component 122, or the reporting component 122 can transmit the audit data, e.g., to the administration client device 114.

Figure 6:
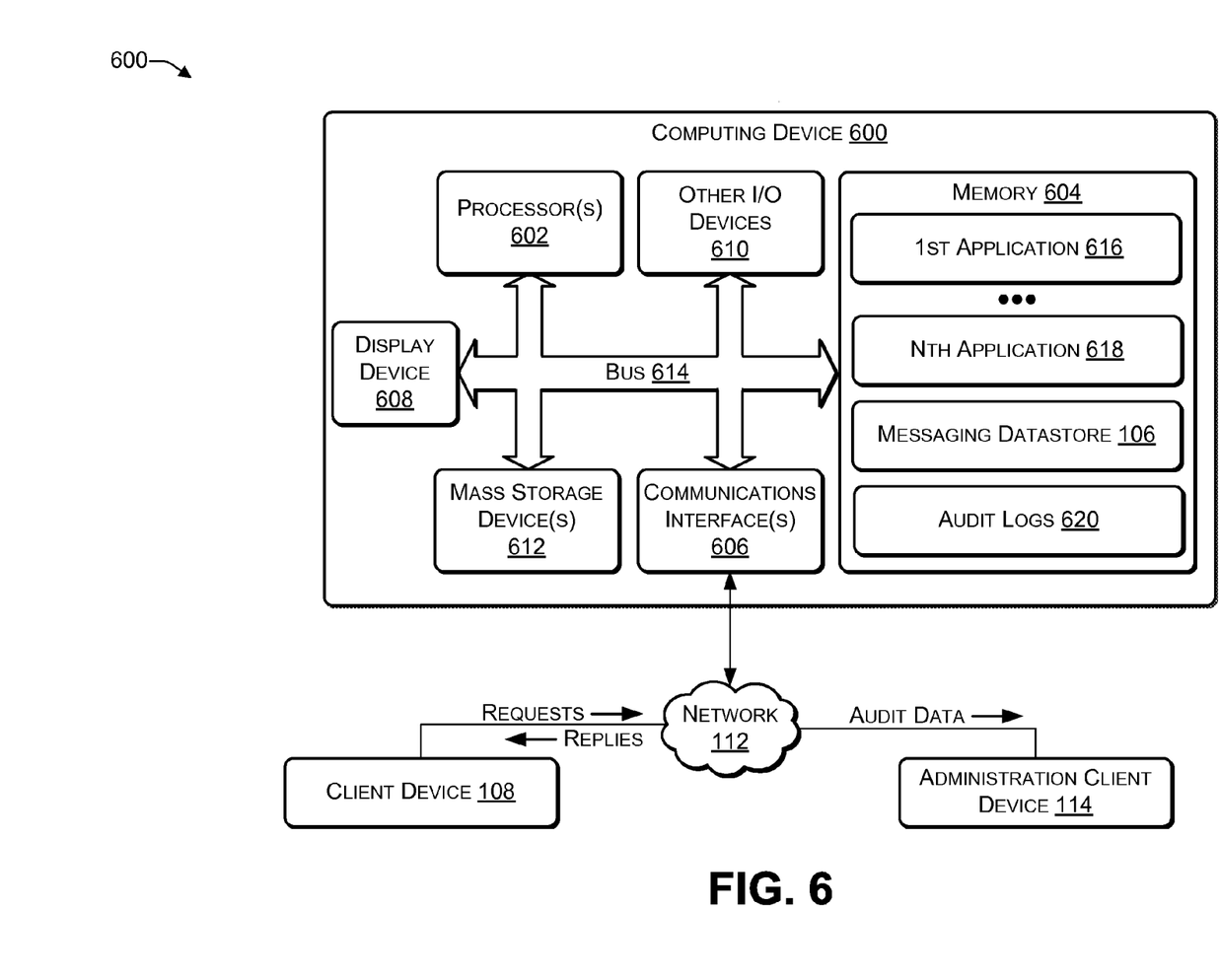
FIG. 6 illustrates an example configuration of a computing device that can be used to implement the systems and techniques described herein.

FIG. 6 illustrates an example configuration of a computing device 600 and environment that can be used to implement the modules and functions described herein. For example, the computing device 600 may be used to implement the architecture 100 of FIG. 1, e.g., including the EM service 102, the interceptor 116, or the reporting component 122. The computing device 600 may include at least one processor 602, a memory 604, one or more communications interfaces 606 (e.g., for communications via the network 112, FIG. 1), a display device 608, other input/output (I/O) devices 610, and one or more mass storage devices 612, configured to communicate with each other, such as via a system bus 614 or other suitable connection.

The processor 602 may include a single processing unit or a number of processing units, all of which may include single or multiple computing units or multiple cores. The processor 602 can be implemented as one or more microprocessors, microcomputers, microcontrollers, digital signal processors, central processing units, state machines, logic circuitries, and/or any devices that manipulate signals based on operational instructions. Among other capabilities, the processor 602 can be configured to fetch and execute computer-readable instructions stored in the memory 604, mass storage devices 612, or other computer-readable media.

Memory 604 and mass storage devices 612 are examples of computer storage media for storing instructions which are executed by the processor 602 to perform the various functions described above. For example, memory 604 may generally include both volatile memory and non-volatile memory (e.g., RAM, ROM, or the like). Further, mass storage devices 612 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a non-transitory media capable of storing computer-readable, processor-executable program instructions as computer program code that can be executed by the processor 602 as a particular machine configured for carrying out operations and functions described in embodiments herein, e.g., as discussed above with reference to FIG. 1-5.

The computer storage media, such as memory 604 and mass storage devices 612, may be used to store software and data. The software may include processor-executable instructions of one or more applications, such as a first application 616 to an Nth application 618 (where N≥1). The applications can include the messaging application 110, the messaging service process 104, the interceptor 116, the reporting component 122, the relay process 120 (e.g., an HTTP server), or the administration client device 114. The data may include, e.g., the messaging datastore 106 or audit logs 620. The audit logs 620 may include information provided by the interceptor 116 to the reporting component 122 or information provided by the reporting component 122 to the administration client device 114.

The computing device 600 may also include one or more communications interfaces 606 for exchanging data with the client device 108 and the administration client device 114, such as via the network 112, direct connection, or the like, as discussed above. For example, the client device 108 may exchange messages with the computing device 600, e.g., operating the EM service 102, via the communications interfaces 606. The communications interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communications interfaces 606 can also provide communication with external storage (not shown), such as in a storage array, network attached storage, storage area network, or the like.

A display device 608, such as a monitor, may be included in some embodiments for displaying information and images to users. Other I/O devices 610 may be devices that receive various inputs from a user and provide various outputs to the user, and may include a keyboard, a remote controller, a mouse, a trackball, a printer, audio input/output devices, and so forth.

Memory 604 may include modules and components for interception or auditing of messages in or exchanged with an EM system according to the embodiments herein. Memory 604 may also include other data and data structures described herein. Memory 604 may further include one or more other software modules, such as an operating system, drivers, communication software, or the like. Memory 604 may also include other data, such as data stored while performing the functions described above and data used by the other modules.

In some embodiments, the client device 108 or the administration client device 114 may include components such as the processor 602, the memory 604, the communications interfaces 606, the display device 608, the I/O devices 610, the mass-storage devices 612, or the system bus 614. The memory 604 of the client device 108 or the administration client device 114 may include corresponding software applications or other processor-executable instructions, e.g., to operate a user interface permitting interaction between a user and the client device 108 or between a user such as a system administrator and the administration client device 114.

The example systems and computing devices described herein are merely examples suitable for some embodiments and are not intended to suggest any limitation as to the scope of use or functionality of the environments, architectures, and frameworks that can implement the processes, components, and features described herein. Thus, embodiments herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry), or a combination of these embodiments. The term "module," "mechanism" or "component" as used herein generally represents software, hardware, or a combination of software and hardware that can be configured to implement prescribed functions. For instance, in the case of a software embodiment, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components, and modules described herein may be implemented by a computer program product.

Furthermore, this disclosure provides various example embodiments, as described and as illustrated in the drawings. However, this disclosure is not limited to the embodiments described and illustrated herein, but can extend to other embodiments, as would be known or as would become known to those skilled in the art. Reference in the specification to "one embodiment," "this embodiment," "these embodiments" or "some embodiments" means that a particular feature, structure, or characteristic described is included in at least one embodiment, and the appearances of these phrases in various places in the specification are not necessarily all referring to the same embodiment.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications, and substitutions without departing from the scope of the present disclosure.

What is claimed is:

1. One or more non-transitory computer-readable media comprising instructions that are executable by one or more processors to perform operations comprising:

transmitting a first request to an electronic messaging service;

receiving from the electronic messaging service a first reply associated with the first request and a notification associated with a client;

receiving, from the client, a second request;

forwarding the second request to the electronic messaging service;

receiving from the electronic messaging service a second reply associated with the second request;

creating a modified second reply including at least a portion of the notification by:

modifying an outer-protocol header of the second reply, modifying an inner-protocol header of the second reply, and modifying an inner-protocol body of the second reply; and transmitting the modified second reply to the client.

2. The one or more non-transitory computer-readable media according to claim 1, wherein the outer-protocol header includes a Hypertext Transfer Protocol (HTTP) reply header and the inner-protocol header includes a Remote Procedure Call (RPC) reply header.

3. The one or more non-transitory computer-readable media according to claim 2, wherein the RPC reply header includes a reply header provided by an electronic messaging service.

4. The one or more non-transitory computer-readable media according to claim 1, the operations further comprising:
transmitting the first request in response to the receiving the second request.

5. The one or more non-transitory computer-readable media according to claim 1, the operations further comprising:
modifying the outer-protocol header prior to modifying the inner-protocol body.

6. The one or more non-transitory computer-readable media according to claim 1, the operations for modifying the inner-protocol body comprising:
inserting the at least a portion of the notification between a first portion of the second response and a second portion of the second response.

7. The one or more non-transitory computer-readable media according to claim 1, wherein the operations for creating the modified second reply are performed in a single interceptor process.

8. The one or more non-transitory computer-readable media according to claim 1, the operations further comprising:
transmitting to the client, before receiving the second reply, a preliminary reply associated with the second request.

9. A computer-implemented method, comprising:
transmitting a first request to a server;
receiving from the server a first reply associated with the first request and a notification associated with a client;
receiving, from the client, a second request;
forwarding the second request to the server;
receiving from the server a second reply associated with the second request;
automatically adding at least a portion of the notification to the second reply to create a modified second reply by modifying:
an outer-protocol header of the second reply,
an inner-protocol header of the second reply, and
an inner-protocol body of the second reply; and
transmitting the modified second reply to the client.

10. The computer-implemented method according to claim 9, wherein the outer-protocol header includes a Hypertext Transfer Protocol (HTTP) reply header and the inner-protocol header includes a Remote Procedure Call (RPC) reply header.

11. The computer-implemented method according to claim 9, further comprising:
transmitting the first request in response to the receiving the second request.

12. The computer-implemented method according to claim 9, further comprising:
modifying the outer-protocol header prior to modifying the inner-protocol body.

13. The computer-implemented method according to claim 9, the modifying the outer-protocol header comprising:
adjusting a length field of the outer-protocol header based at least in part on a size of the at least a portion of the notification.

14. The computer-implemented method according to claim 9, wherein the outer-protocol header, the inner-protocol header, and the inner-protocol body are modified in a single interceptor process.

15. The computer-implemented method according to claim 9, further comprising adding an interceptor executable in one or more processors to the server, wherein the interceptor is configured to perform at least one of transmitting the first request, receiving the notification, or creating the modified second reply.

* * * * *